July 8, 1941.　　L. W. STETTNER　　2,248,592
PRESSURE REGULATOR
Filed April 28, 1939
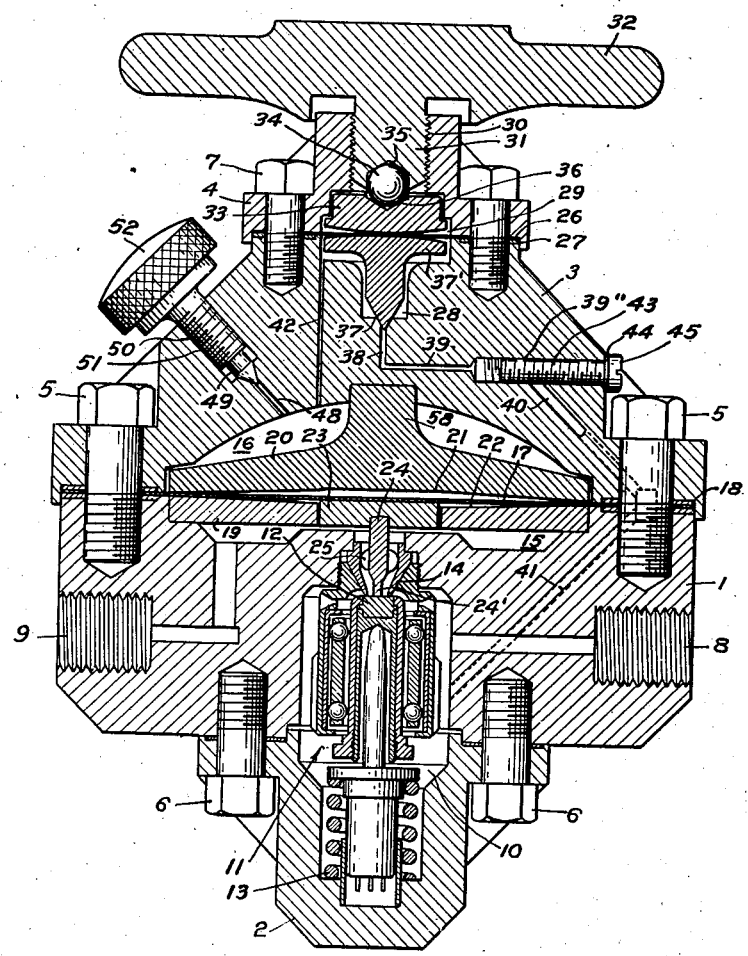
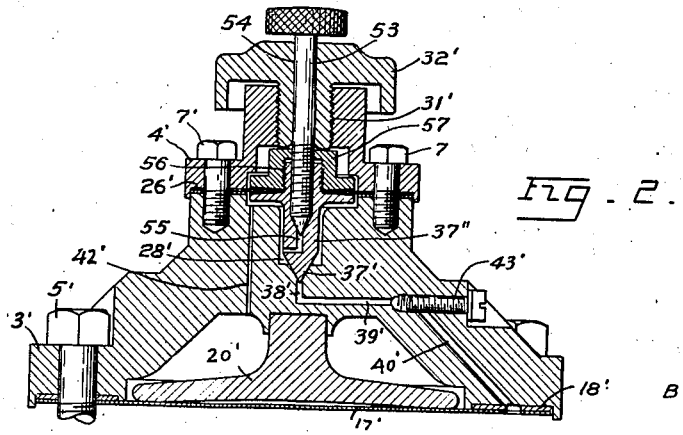
INVENTOR.
LUDWIG W. STETTNER
BY
ATTORNEY.

Patented July 8, 1941

2,248,592

UNITED STATES PATENT OFFICE 2,248,592

PRESSURE REGULATOR

Ludwig W. Stettner, Piedmont, Calif., assignor to Victor Equipment Co., San Francisco, Calif., a corporation of Delaware Application April 28, 1939, Serial No. 270,561

6 Claims. (Cl. 50—21)

This invention relates to automatic gas pressure regulators of the type used for reducing the pressures of gases used in welding and cutting to maintain a working pressure, and the invention has for its principal object an improved construction in the specific type of such regulators in which gas under pressure is used instead of a spring, to balance the desired working pressure.

Features and advantages of the improvement will appear in the following description and accompanying drawing.

In the drawing:

Figure 1 is a longitudinal central sectional view taken through one of my improved gas pressure regulators.

Figure 2 is a similar sectional view to that of Figure 1, but showing the bonnet only of a modified form of the invention.

As the invention relates to the construction within or carried by the bonnet of the regulator, the description will be confined as much as possible to these particular features.

In Figure 1 the body of the regulator is designated 1, the lower cap 2 which covers the valve mechanism, the bonnet 3, and the cap above the bonnet 4.

The bonnet 3 is secured to the body by cap screws 5, and the caps 2 and 4 are similarly secured to their supporting members as by screws 6 and 7.

Extending into the body is a high pressure gas inlet 8 and a low or controlled pressure outlet 9 both threaded for attaching to inlet and outlet pipes not shown. The inlet 8 opens to a high pressure chamber 10 in which is positioned suitable valve mechanism generally designated 11 and which includes a valve button 12 and a spring 13 for urging the valve button to closed position against a tubular seat 14, which leads to a low pressure chamber 15 which is always open to low pressure outlet 9.

Within the bonnet 3 is a chamber 16 which is separated from chamber 15 by a flexible diaphragm 17 the margins of which are faced on opposite sides by flat gasket sealing rings 18 and clamped between the confronting margins of the bonnet and the body of the regulator. On opposite sides of this diaphragm are rigid plates 19 and 20 entirely covering the unclamped portion of the diaphragm, and which plates are recessed at their margins respectively in the body and the bonnet, and slightly hollowed out on their confronting sides as indicated at 21 and 22 conforming to and providing a maximum flexing of the diaphragm under pressure applied to either side of it. Plate 20 is imperforate, but plate 19 however, is provided with a relatively large central aperture in which a disk 23 is movably positioned. This disk 23 bears at its upper side against the lower side of the diaphragm and is drilled centrally at its under side with a shallow hole in which the shank 24 of a pin easily fits, and the opposite end 24' of which pin bears against the upper end of valve button 12 freely within the area of the tubular valve seat 14. Pin 24 also has laterally projecting fins 25 guided in the enlarged upper end of the tubular valve seat.

Plate 20 is preferably provided with a central finished hub 58 which fits nicely into a finished recess in the underside of the bonnet.

Between cap 4 and the bonnet is a flexible diaphragm 26 suitably sealed by one or more gasket rings 27 and clamped tightly in place by bonnet screws 7. This diaphragm covers a chamber 28 recessed into the bonnet, and separates it from a similar chamber 29 recessed into the cap 4, and the latter recess is extended as a bore through the upper end of the cap and internally threaded as at 30 to receive the threaded shank or hub 31 of a handwheel 32. Below the lower end of the shank 31 is a thick disk 33 slightly rounded on its under face and supported on the upper side of diaphragm 26, while between disk 33 and handwheel shank 31 is a pressure distributing ball 34 revolvably retained in a relatively deep recessed seat 35 in the shank and bearing in a shallower seat 36 formed in the disk.

Below the diaphragm in chamber 28 is a needle valve member 37 formed with a disk-like upper end 37' rounded slightly on its outer face and bearing against the under side of diaphragm 26.

This needle valve is arranged to close the upper end of a small drilled hole 38 which extends at several stages 39, 40, 41 to the margin of the bonnet, through the gaskets and rim of diaphragm 17 to the high pressure space 10, while another drill hole 42 connects chamber 28 with chamber 16. Hole 39 is enlarged at 39" and extended past hole 40 to open at the outside of the bonnet and is internally threaded and fitted with a screw 43 with a soft metal gasket 44 under its head 45 so that it will seal gas tight at this point when screwed up tight. This screw passes the point where hole 40 connects with hole 39", so that gas under high pressure from chamber 10 by way of passages 40 and 41 in attempting to pass into passage 39" will be throttled down to the very slight clearance normally existing between the threads of screw 43 and the threads of the hole 39", so that in event handwheel 32 were unscrewed quickly in admitting more pressure to chamber 16 there would not be a sudden excess rush of high pressure gas to the chamber.

Means for bleeding off the pressure from chamber 16 as may be desired, is provided by a small passage 48 extending from the chamber and normally closed at its end by a needle valve 49 at the end of a screw 50 threaded into a hole 51 leading to atmosphere. A large milled thumb nut 52 provides for easy manual operation of this needle valve, and when the valve is released the gas pressure escapes by the slight thread clearance along the screw as previously explained for screw 43.

In operation the inlet passage 8 is connected through means of a suitable coupling with a tank of high pressure gas, such as oxygen, acetylene, or other gas as used in welding, and outlet 9 is similarly connected to one passage of the operating tool. Suitable pressure gages are of course provided between the supply tank and the regulator, or on the supply tank, and also between the regulator and the tool or on the regulator open to its low pressure chamber 15 as is common practice. Then, by turning handwheel 1 to admit gas under pressure to chamber 16 it will find its way through the ordinary inequalities of commercial workmanship to the slight space 21 above diaphragm 17 until it forces the diaphragm and disk 23 down to open valve 12, and whereupon high pressure gas flows past this valve from chamber 10 until the pressure above diaphragm 17 is balanced and valve 12 closes, as well understood in the use of such regulators.

By properly manipulating handwheel 32 and relief screw 52 any desired gas pressure may be set up in chamber 16 and sealed in the bonnet by closing both valves 49 and 37 to thus maintain any desired working pressure in low pressure chamber 15.

In the modification shown in Figure 2, the bonnet and main diaphragm assembly are shown detached from the body of the regulator, and the similar parts already described for Figure 1 are given the same numerals additionally primed, and therefore need no further explanation.

The modified features are that the gas relief screw valve 49—52 of Figure 1 is not used, but in place of it a long relief screw valve 53 is extended through an axial hole 54 in the handwheel 32' and shank 31' and threaded into an axial hole in needle valve member 37'' to close off a small hole 55 opening through the side of the needle valve to chamber 28'.

In order to prevent the rotation of valve member 37'' when the relief screw valve 53 is turned, member 37'' is provided with a threaded shank 56 which extends through a central opening in diaphragm 26' and is firmly clamped against it by a nut member 57 (which takes the place of member 33 of Figure 1) and against the upper end of which nut member the lower end of handwheel shank 31' bears for closing valve 37' as the handwheel 32' is turned.

In either of the constructions the turning of the handwheel forces the needle valve toward closed position, and flexes the diaphragm slightly out of its natural plane, while upon reverse turning permits the gas pressure to lift the valve, though aided by the recovery force of the diaphragm.

As screw 43 is for choking purposes its original setting is never altered, as the separate relief screw valve 50 or 53 provides for reduction of the bonnet pressure, and needle valve 37 or 37' provides for admission of additional pressure as well as final sealing of the pressure against further change.

In former valves of this type the whole lower plate 19 (Figure 1) was permitted to rise or fall and its entire weight carried on valve releasing pin 24 to be finally supported by spring 13, and this is avoided by my use of the loose piece 23 which aids in sensitivity.

I am aware of prior regulators of this type using gas pressure above the regulating diaphragm instead of a spring to control the pressure, but I do not know of any prior structures of this kind having the simplicity of control and insuring against impairment of bonnet pressure from leakage, shown in this improved construction.

I therefore claim:

1. In an automatic gas pressure regulator having a flexible diaphragm exposed to a controlling gas pressure on one side for controlling the movements of a valve for regulating gas pressure admission to the opposite side, the improvement which comprises providing a rigid plate on opposite sides of said diaphragm spaced to limit its movement in flexing, means mounting said plates against movement, one of the plates being imperforate and the other only having an opening through it with a loose member therein contacting the diaphragm, and means extended from said loose member for operating the valve, means for admitting a controlling gas under pressure behind said imperforate plate, and means forming a substantially closed marginal joint around the edge of said imperforate plate, but insufficiently perfect to stop the controlling gas under pressure from passing the joint to reach said diaphragm and vice versa.

2. In an automatic gas pressure regulator having a flexible diaphragm exposed to a controlling gas pressure on one side for controlling the movements of a valve for regulating gas pressure admission to the opposite side, the improvement which comprises providing a rigid plate on opposite sides of said diaphragm spaced to limit its movements in flexing, one of the plates being imperforate and the other only having an opening through it with a loose member therein contacting the diaphragm, and means extended from said loose member for operating the valve, said loose member being a disk movable transversely of the plate in a hole formed therein, and the opposite imperforate plate provided with a hub engaging a recess in the regulator structure to position the latter plate relative to the diaphragm and support it against the entire pressure in use, means for admitting a controlling gas under pressure behind said imperforate plate, and means forming a substantially closed marginal joint around the edge of said imperforate plate, but insufficiently perfect to stop the controlling gas under pressure from passing the joint to reach said diaphragm and vice versa.

3. In an automatic gas pressure regulator having a flexible diaphragm exposed to a controlling gas pressure on one side for controlling the movements of a valve for regulating gas pressure admission to the opposite side, the improvement which comprises providing an imperforate rigid plate covering substantially the whole side of said diaphragm exposed to said controlling gas pressure and concavely dished on said side to the form of the diaphragm when flexed to limit its movement in flexing, said imperforate plate contacting the diaphragm around its margin and provided with a central hub seated in a recess in the regulator structure for positioning the plate and preventing its movement relative to the diaphragm, the marginal contact of said plate with said diaphragm being finished, but insufficiently perfect to stop gas under pressure from passing through the juncture.

4. In an automatic gas pressure regulator having a flexible diaphragm exposed to a controlling gas pressure on one side for controlling the movements of a valve for regulating gas pressure admission to the opposite side, the improvement which comprises providing an imperforate rigid plate on the side of said main diaphragm exposed to said controlling gas pressure spaced to limit its movement in flexing, said imperforate plate covering substantially the whole area of the diaphragm and contacting it around its margins and provided with a central hub on its outer side seated against the regulator structure wholly supporting the plate against pressure from the opposite side, the marginal contact of said plate with said diaphragm being finished, but insufficiently perfect to stop gas under pressure from passing through the juncture.

5. In an automatic gas pressure regulator having a diaphragm controlled valve, and a bonnet on the regulator forming with the outer side of said diaphragm a closed chamber and having a passageway for directing gas under pressure to said chamber for influencing said diaphragm to react upon said valve, the improvement which comprises providing a pair of rigidly mounted confronting rigid plates embracing said diaphragm adjacent its outer margins and both inwardly concavely dished to the form of the desired maximum flexing of the diaphragm to freely permit the limited operative flexing of said diaphragm, the plate at the bonnet side of the diaphragm being imperforate and affording no passageway for gas from within the bonnet to the diaphragm save such as can pass through the contacting margins of the plate and diaphragm due to the slight surface inequalities of ordinary machining of the plate, the marginal contact of said plate with said diaphragm being finished, but insufficiently perfect to stop gas under pressure from passing through the juncture.

6. In an automatic gas pressure regulator having a diaphragm controlled valve, and a bonnet on the regulator forming with the outer side of said diaphragm a closed chamber and having a passageway for directing gas under pressure to said chamber for influencing said diaphragm to react upon said valve, the improvement which comprises providing a pair of rigid confronting plates embracing said diaphragm adjacent its outer margins and both inwardly concavely dished to the form of the desired maximum flexing of the diaphragm to freely permit the limited operative flexing of said diaphragm, means mounting both plates rigidly against movement, the plate at the bonnet side of the diaphragm being imperforate and affording no passageway for gas from within the bonnet to the diaphragm save such as can pass through the contacting margins of the plate and diaphragm, and the other plate provided with a floating central section in contact with the opposite side of said diaphragm, the marginal contact of said plate with said diaphragm being finished, but insufficiently perfect to stop gas under pressure from passing through the juncture.

LUDWIG W. STETTNER.